United States Patent
Hartley et al.

(10) Patent No.: US 6,253,017 B1
(45) Date of Patent: Jun. 26, 2001

(54) FIBER OPTIC CONNECTOR WITH OPTICAL ATTENUATOR

(75) Inventors: James Thomas Hartley, Tustin; Stephen Wesley Wall, Costa Mesa, both of CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/368,178

(22) Filed: Aug. 4, 1999

(51) Int. Cl.[7] .................................................. G02B 6/38
(52) U.S. Cl. ............................................................ 385/140
(58) Field of Search ................................................ 385/140

(56) References Cited

U.S. PATENT DOCUMENTS

| | | | |
|---|---|---|---|
| 4,261,640 | * | 4/1981 | Stankos et al. ..................... 385/140 |
| 4,878,730 | * | 11/1989 | Wall ....................................... 385/56 |
| 4,900,124 | * | 2/1990 | Lampert et al. ....................... 385/73 |
| 5,067,783 | * | 11/1991 | Lampert ................................. 385/60 |
| 5,082,345 | * | 1/1992 | Cammons et al. ..................... 385/60 |
| 5,257,335 | * | 10/1993 | Kurata et al. .......................... 385/78 |
| 5,321,790 | * | 6/1994 | Takahashi et al. .................. 385/140 |

\* cited by examiner

*Primary Examiner*—Hemang Sanghavi
*Assistant Examiner*—Michelle R. Connelly-Cushwa
(74) *Attorney, Agent, or Firm*—Richard A. Jones

(57) ABSTRACT

The fiber optic connector with an optical attenuator includes a first end assembly, a second end assembly and an alignment sleeve. The first end assembly includes a bushing with a central bore and an optical fiber passing through the central bore. The second end assembly includes a bushing with a central bore and an optical fiber passing through the central bore. The alignment sleeve receives the first and second end assemblies and holds the two optical fibers in axial alignment. The alignment sleeve also holds a thin plastic or glass optical attenuator disc with a selected optical density between the two end assemblies. When the connector is held in a connector housing assembly, the axially aligned optical fibers have their ends in contact with opposite sides of the optical attenuator disc. A spring bias the optical fiber ends toward the optical attenuator disc. An optical attenuator disc with a different optical density can replace the disc in the alignment sleeve to change attenuation. An alignment sleeve with an optical attenuator disc can also be replaced by another alignment sleeve with an attenuator disc having a different optical density.

7 Claims, 2 Drawing Sheets

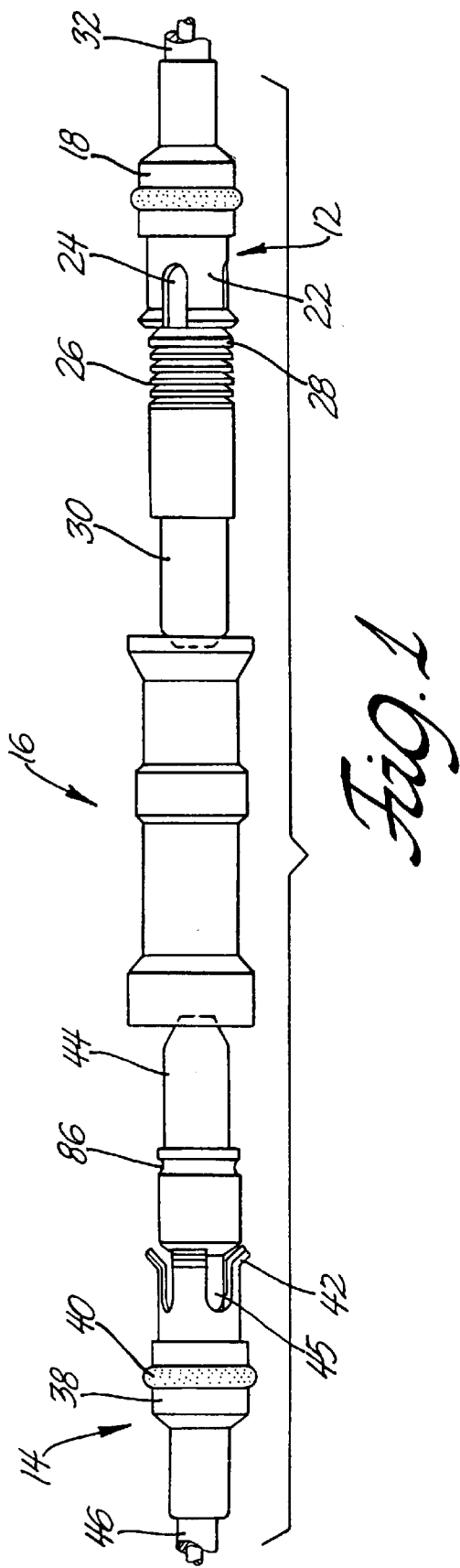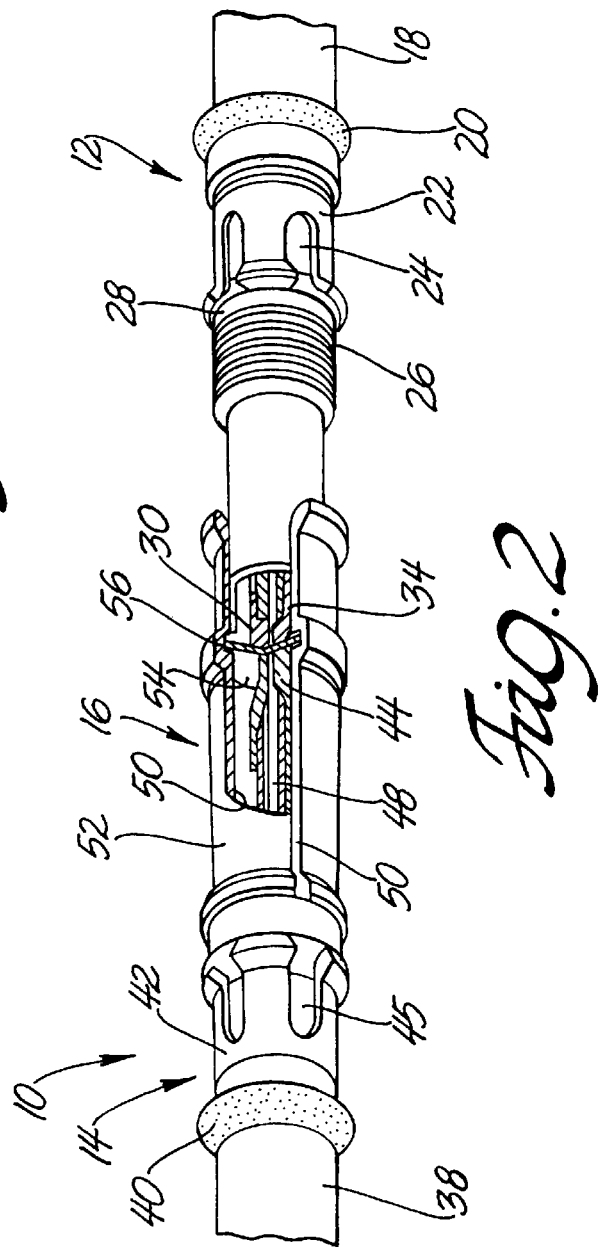

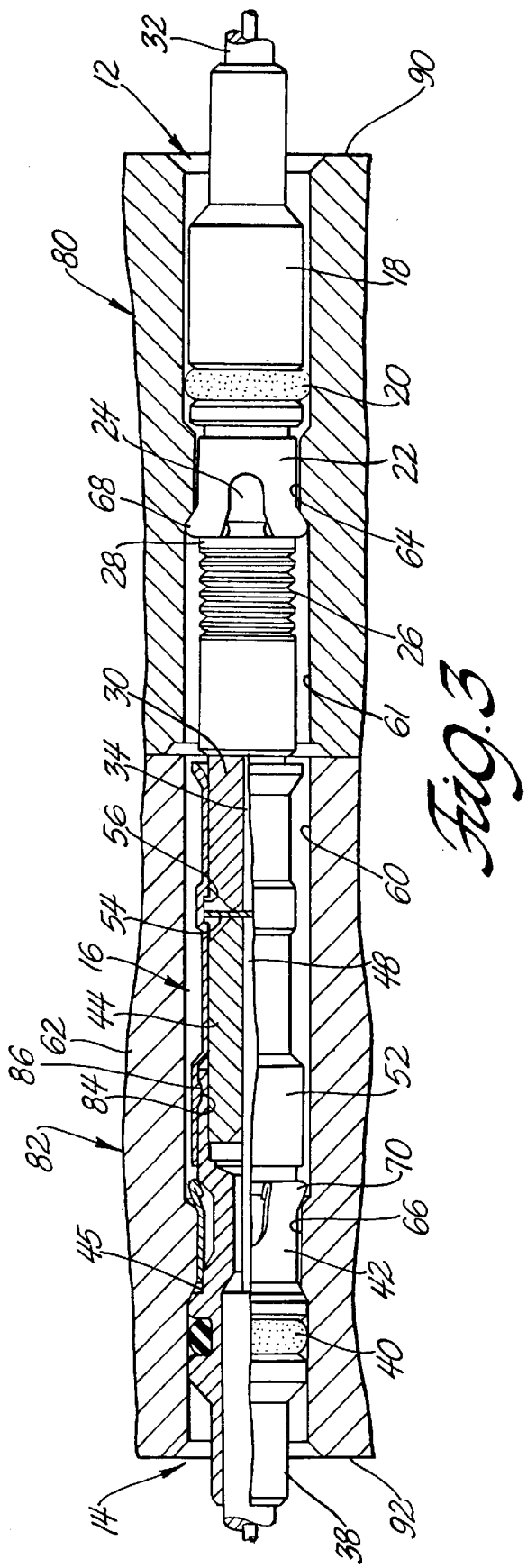
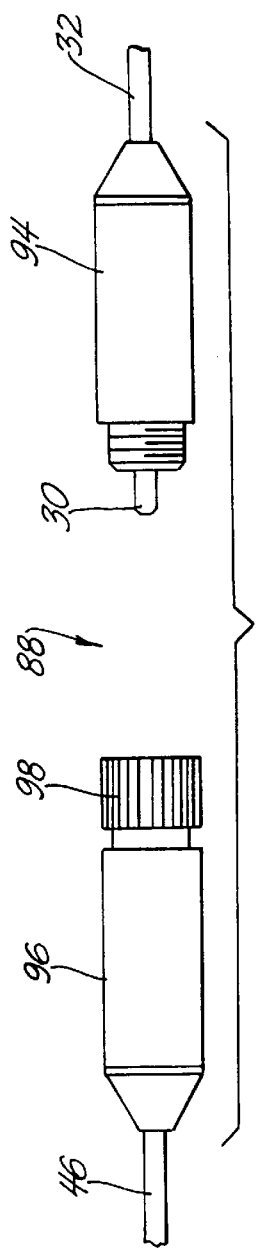
Fig. 3
Fig. 4

FIBER OPTIC CONNECTOR WITH OPTICAL ATTENUATOR

FIELD OF THE INVENTION

This invention is in a fiber optic connector with an optical attenuator and more particularly in a connector with a changeable optical attenuator with predictable alteration of optical signals.

BACKGROUND OF THE INVENTION

Optical attenuators serve two primary purposes. The first purpose is to reduce the optical power transmitted in a system to allow for transmitter to detector balance. There is some loss of optical power over the length of a fiber optic cable. Additional optical power losses occur in each connector interface. An optical signal that travels a substantial distance between a transmitter and a detector or that travels through a number of connector assemblies will lose substantial optical power before the signal reaches a detector. Due to this loss of optical power, optical attenuators may be undesirable. On the other hand an optical signal that travels a relatively short distance through a relatively small number of connectors may have optical power at the detector that exceeds the detectors optimum optical power range. In situations in which signals with very high optical power reach a detector, it may be necessary to reduce the optical power with an optical attenuator to obtain optimum detector performance. The second purpose for employing optical attenuators is to test system performance. To test optical signal transmission systems the optical power must be reduced by a measurable quantity. Such tests can be used to test the system limits. To determine if an optical system will work when the optical power is reduced by 50% or some other selected amount, the optical power has to be reduced by 50% or another selected amount. Such a reduction is preferably made without changing the transmitter or the detector. To test the system performance as if under adverse conditions, it is necessary to degrade the system by a known quantity and then test for function. This will insure that the system will function under all conditions.

Optical attenuators that are currently used in operating optical systems either change the gap between two fiber optic cable ends or change the alignment between two fiber optic cable ends. The amount of attenuation obtained by these procedures depends on a number of different factors. These factors include fiber optic cable end shape and surface finish. Currently the ends of fiber optic cables in high performance systems are ground and polished. No two ground and polished fiber optic cable ends are exactly the same even when made in a laboratory. The variations in fiber optic cable end shapes make control of the gap between two cable ends difficult. It has not been possible to provide large air gaps in connectors that normally have abutting termini. Fiber optic cable connection end misalignment is difficult to control and measure. The misalignment angle, cable center line alignment, the gap between two cable ends, cable end shape and cable end surface condition all make a difference. Control of all these factors in the field is impossible.

SUMMARY OF THE INVENTION

An object of the invention is to provide a fiber optic connection with an optical attenuator and no air gaps. Another object of the invention is to provide an optical attenuator that has repeatable optical attenuation.

The optical connector of this invention has two termini and an alignment sleeve. The termini are held in a housing. A spring assembly in one of the termini urges the termini toward abutment with each other. The alignment sleeve aligns adjacent ends of the termini and houses an optical filter. Optical filters of different optical densities are each mounted in an alignment sleeve. To change optical attenuation, an alignment sleeve is chosen that houses an optical filter with a required optical density. The chosen alignment sleeve is then used to align the two termini. The optical fiber in each of the termini are held in alignment with each other and in contact with the optical filter. The optical filter or attenuator is a thin plastic film or glass disc. The plastic film or glass disc is colored or darkened to provide optical attenuation. Different optical densities are obtained by varying the coloring or darkening.

BRIEF DESCRIPTION OF THE DRAWINGS

The presently preferred embodiment of the invention is disclosed in the following description and in the accompanying drawings, wherein:

FIG. 1 is an enlarged and expanded view of a fiber optic connector with an optical attenuator;

FIG. 2 is a perspective view of a fiber optic connector with parts broken away to show the construction and an optical attenuator;

FIG. 3 is a sectional view of a portion of a connector housing with a fiber optic connector in terminus cavities; and FIG. 4 is an expanded view of the connector housing.

DETAILED DESCRIPTION OF PREFERRED EMBODIMENT

The fiber optic connector with an optical attenuator 10 has a first end assembly 12, a second end assembly 14 and an alignment sleeve assembly 16. The first end assembly 12 has a terminus body 18. An O-ring seal 20 is mounted in a groove in the body 18. A retention clip 22 is secured to a reduced diameter portion 24 of the body 18. Belleville washers or other spring mechanisms 26 are telescopically received on the body 18 and abut flange 28. A bushing 30 extends from an end of the body 18. A fiber optic cable 32 enters one end of the first end assembly 12 and an optical fiber 34 of the fiber optic cable 32 extends through the bushing 30. Bushings 30 are made of zirconia in ceramic alignment termini and of stainless steel in metal alignment termini. The optical fiber 34 is preferably epoxy bonded inside the end assembly 12. The end of optical fiber 34 is ground and polished with its polished end surface substantially flush with the end of the alignment bushing 30.

The second end assembly 34 has a metal terminus body 38. An O-ring seal 40 is mounted in a groove in the body 38. A retention clip 42 is mounted in a reduced diameter portion 45 of the body 38. A bushing 44 extends from an end of the body 38. In ceramic alignment termini, the bushing 44 is made of zirconia. Stainless steel is used to make the bushing 44 for metal alignment termini.

A fiber optic cable 46 enters one end of the second end assembly 14 and an optical fiber 48 of the fiber optic cable 46 extends through the bushing 44. The optical fiber 48 is preferably epoxy bonded inside the end assembly 14. The end of the optical fiber 48 is ground and polished with its polished end surface substantially flush with the end of the alignment bushing 44.

The alignment sleeve assembly 16 of the fiber optic connector with an optical attenuator 10, as shown in FIG. 2, has an optical attenuator disc 54 mounted in a cylindrical recess or slot 56 on the inside of the alignment sleeve assembly 16. The slot 56 is much wider in an axial direction than the thickness of the optical attenuator disc 54. The attenuator disc 54 is a thin plastic film or glass disc that is colored or darkened to provide optical attenuation. The coloring or darkening is varied as required to obtain the desired optical density and obtain the desired optical attenuation. The alignment sleeve assembly 16 is made from beryllium copper and heat treated. A slot 50 is cut in a wall of the sleeve assembly.

The first end assembly 12 is inserted into a terminus cavity 61 to form a pin insert 80 as shown in FIG. 3. The clip 22 contacts the reduced diameter portion 64 of the pin insert 80 to hold the first end assembly 12 in the terminus cavity 61. The second end assembly 14 is inserted into a terminus cavity 60 to form a socket insert 82. The clip 42 contacts a reduced diameter portion 66 of the socket insert 82 to hold the second end assembly 14 in the terminus cavity 60. The alignment sleeve assembly 16 is inserted into the terminus cavity 60 and the internal ring boss 84 of end portions 52 snaps into the groove 86 on the end portion of body 38 of second end assembly 14 to hold the alignment sleeve on the second end assembly. The pin insert 80 and the socket insert 82 are inserts in a holder assembly 88 that forces the rear 90 of the pin insert 80 toward the rear 92 of the socket insert 82. The holder assembly 88 can take many forms. As shown in FIG. 4, the holder assembly 88 includes two cylindrical cup members 94 and 96. A threaded ring 98 rotatably journaled on one of the cylindrical cup member 96 engages threads 100 on the other cylindrical member 94 and forces the two cylindrical members together.

The optical fiber 48 that extends through and is polished flush to the end of the bushing 44 of the second end assembly 14 contacts the optical attenuator disc 54. The optical fiber 34 that extends through and is polished flush to the end of the bushing 30, of the first end assembly 12, also contacts the optical attenuator disc 54 and is in alignment with the fiber optic fiber 48 and on the opposite side of the optical attenuator disc and the optical fiber 48. The spring 26 bias the optical fiber 34 into contact with the optical attenuator disc 54 and bias the optical attenuator disc into contact with the optical fiber 48. The optical attenuator disc 54 floats in the slot 56 in the alignment sleeve 16 to accommodate variations in the parts of the connector 10 and changes due to thermal expansion or contraction. The flange 28 and the clip 22 are telescopically received on the body 18. This allows the spring assembly 26 to maintain a substantially constant force that biases the bushing 30 and the bushing 44 toward the attenuator disk 54 and each other.

The fiber optic connector with an optical attenuator 10 is mounted in a holder assembly 88 as described above. The reduced diameter portions 64 and 66 of the pin insert 80 and the socket insert 82 are held in fixed positions by the holder assembly 88. The tips of fingers 68 on the retention clip 22 engage the reduced diameter portion 64 of the pin insert 80 and hold the first end assembly 12 in the terminus cavity 61. The tips of fingers 70 on the retention clip 42 engage the reduced diameter portion 66 of the socket insert and hold the second end assembly 14 in the terminus cavity 60. In the position shown in FIG. 3, the retention cups or fingers 68 and 70 of the clips 22 and 42 lock the first end assembly 12 and the second end assembly 14 in the pin insert 80 and the socket insert 82 and form a housing 62. The holder assembly 88 applies force to the pin insert 80 and the socket insert 82 thereby applying a mating force to the spring 26. This compression of the spring 26 provides a preload that permits the spring to maintain a continuous contact pressure between the optical attenuator disc 54 and the optical fibers 34 and 48.

The first end assembly 12 can be removed from the terminus cavity 61 by applying an axial force to the tips of the fingers 68 of the retention clip 22 to compress the fingers radially inward and thereby permit the clip to move through the reduced diameter portion 62 of the cavity 61 in the housing 62. After the alignment sleeve 16 is removed from the second end assembly 14, the second end assembly can be removed from the terminus cavity 60 by applying an axial force to the tips of the fingers 70 of the retention clip 42 to compress the fingers radially inward and thereby permit the clip to move through the reduced diameter portion 66 of the cavity 60.

The optical attenuator disc 54 can be changed by removing the alignment sleeve 16 from the terminus cavity 60. The alignment sleeve 16 is then replaced by another alignment sleeve having an optical attenuator disc 54 with the desired optical attenuation. The new alignment sleeve 16 is then inserted into the terminus cavity 60 and snaps onto the radial groove 86 on terminus 14.

The optical attenuator disc 54 is not limited to use of the specific fiber optic connector described above. Optical connectors that employ an alignment sleeve can most likely accommodate an optical attenuator disc 54. Optical connectors which maintain contact between the end surfaces of two fiber optic cables 32 and 46 can most likely be modified to accommodate an optical attenuator disc 54. Many connectors without an alignment sleeve can also use an optical attenuator disc 54 with some modification to accommodate and position a disc.

The disclosed embodiment is representative of a presently preferred form of the invention, but is intended to be illustrative rather than definitive thereof. The invention is defined in the claims.

We claim:

1. A fiber optic connector with an optical attenuator comprising:

a first end assembly with a first bushing holding a first optical fiber of a first fiber optic cable;

a second end assembly with a second bushing holding a second optical fiber of a second optical fiber cable;

an alignment sleeve that receives the first bushing and the second bushing and axially aligns an end of said first optical fiber with an end of said second optical fiber;

an optical attenuator disc having a selected optical density mounted inside said alignment sleeve and positioned between an end of said first optical fiber and an end of said second optical fiber;

a connector housing assembly having a pin insert that holds the first end assembly releasably, and a socket insert that holds the second end assembly releasably with the alignment sleeve being releasably held in the socket insert by the second end assembly, wherein an outside surface of the second end assembly interacts with an inside surface of the alignment sleeve to releasably hold the alignment sleeve in the socket insert; and at least one spring that acts on the connector housing assembly and the first end assembly and biases an end of said first optical fiber toward the optical attenuator disc and biases the optical attenuator disc toward an end of said second optical fiber.

2. A fiber optic connector with an optical attenuator as set forth in claim 1 wherein the optical attenuator disc is axially positioned in said alignment sleeve by the first end assembly and the second end assembly.

3. A fiber optic connector with an optical attenuator as set forth in claim 1 wherein the optical attenuator disc is replaceable by a substitute optical attenuator disc having a different optical density.

4. A fiber optic connector with an optical attenuator as set forth in claim 1 wherein said optical attenuator disc includes a thin plastic film.

5. A fiber optic connector with an optical attenuator as set forth in claim 1 wherein said optical attenuator disc includes a glass disc.

6. A fiber optic connector with an optical attenuator comprising:

a first end assembly with a first bushing holding a first optical fiber of a first fiber optic cable;

a second end assembly with a second bushing holding a second optical fiber of a second fiber optic cable;

an alignment sleeve that receives that first bushing and the second bushing and axially aligns an end of said first optical fiber with an end of said second optical fiber;

an optical attenuator disc having a selected optical density slideably mounted in said alignment sleeve and positioned between an end of said first optical fiber and an end of said second optical fiber;

a connector housing assembly having a pin insert, a socket insert and a holder assembly that holds the pin insert and the socket insert in fixed positions, the first end assembly being held releasably in the pin insert by a first retention clip that is part of the first end assembly, the second end assembly being held releasably in the socket insert by a second retention clip that is part of the second end assembly, and the alignment sleeve being held releasably in the socket insert by the second end assembly to facilitate replacement of the optical attenuator disc, wherein an outside surface of the second end assembly interacts with an inside surface of the alignment sleeve to releasably hold the alignment sleeve in the socket insert; and a spring that acts on the connector housing assembly and the first end assembly and biases an end of the first optical fiber toward the optical attenuator disc and biases the optical attenuator disc toward an end of said second optical fiber so that the optical attenuator disc is axially positioned in said alignment sleeve by the first end assembly and the second end assembly.

7. The fiber optic connector as defined in claim 6 wherein the alignment sleeve has an internal ring boss, that is received in a groove of the second end assembly to releasably hold the alignment sleeve in the socket.

* * * * *